(12) United States Patent
Oechsle et al.

(10) Patent No.: US 6,820,424 B2
(45) Date of Patent: Nov. 23, 2004

(54) COMBUSTOR MODULE

(75) Inventors: Victor L. Oechsle, East Avon, IN (US); Timothy C. Roesler, Plainfield, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/951,848

(22) Filed: Sep. 12, 2001

(65) Prior Publication Data

US 2003/0046936 A1 Mar. 13, 2003

(51) Int. Cl.$^7$ ................................................ F02C 7/22
(52) U.S. Cl. ................................... 60/737; 60/743
(58) Field of Search ........................ 60/737, 738, 743, 60/746, 751, 804

(56) References Cited

U.S. PATENT DOCUMENTS

| | | | | |
|---|---|---|---|---|
| 2,552,851 A | * | 5/1951 | Gist, Jr. ........................ | 60/738 |
| 2,920,449 A | * | 1/1960 | Johnson et al. ............... | 60/739 |
| 2,949,012 A | * | 8/1960 | Ferrie et al. .................. | 60/738 |
| 3,430,443 A | * | 3/1969 | Richardson et al. .......... | 60/738 |
| 3,570,242 A | * | 3/1971 | Leonardi et al. .............. | 60/737 |
| 3,682,390 A | * | 8/1972 | Chesire et al. ................ | 60/748 |
| 3,736,746 A | * | 6/1973 | DuBell et al. ................. | 60/804 |
| 3,946,553 A | * | 3/1976 | Roberts et al. ............... | 60/737 |
| 4,088,437 A | * | 5/1978 | Holzapfel ..................... | 431/161 |
| 4,138,842 A | * | 2/1979 | Zwick ......................... | 60/39.23 |
| 4,561,257 A | * | 12/1985 | Kwan et al. .................. | 60/737 |
| 4,610,135 A | | 9/1986 | Alexander | |
| 4,838,029 A | | 6/1989 | Gleason et al. | |
| 4,982,570 A | | 1/1991 | Waslo et al. | |
| 5,099,644 A | | 3/1992 | Sabla et al. | |
| 5,117,637 A | | 6/1992 | Howell et al. | |
| 5,216,885 A | | 6/1993 | Taniguchi et al. | |
| 5,307,634 A | | 5/1994 | Hu | |
| 5,319,923 A | | 6/1994 | Leonard et al. | |
| 5,321,948 A | | 6/1994 | Leonard | |
| 5,341,645 A | * | 8/1994 | Ansart et al. ................. | 60/737 |
| 5,402,633 A | | 4/1995 | Hu | |
| 5,467,926 A | | 11/1995 | Idleman et al. | |
| 5,601,238 A | | 2/1997 | Rawlins et al. | |
| 5,673,552 A | | 10/1997 | Idleman et al. | |
| 5,735,115 A | | 4/1998 | Maghon | |
| 5,749,219 A | | 5/1998 | DuBell | |
| 5,791,137 A | | 8/1998 | Evans et al. | |
| 5,862,668 A | | 1/1999 | Richardson | |
| 5,966,937 A | | 10/1999 | Graves | |
| 5,996,352 A | | 12/1999 | Coughlan et al. | |
| 6,026,644 A | | 2/2000 | Ito et al. | |
| 6,070,411 A | | 6/2000 | Iwai et al. | |
| 6,295,801 B1 | * | 10/2001 | Burrus et al. ................ | 60/737 |

* cited by examiner

*Primary Examiner*—Ted Kim
(74) *Attorney, Agent, or Firm*—Woodard Emhardt Moriarty McNett & Henry LLP

(57) ABSTRACT

A combustor module includes a pre-vaporizing chamber defined by an inner wall, and an outer wall, and a heat shield. The heat shield separates the pre-mixing zone from the reaction zone of the combustor. At least one fueling nozzle is disposed in the pre-vaporizing chamber for injecting fuel into the pre-vaporizing chamber. Fuel from the fueling nozzle is sprayed onto the surface of the heat shield, thereby simultaneously vaporizing the fuel and cooling the heat shield. The heat shield also includes a pilot fueling spray opening to allow fuel to pass directly into the reaction zone of the combustor to provide a piloting flame stability region therein.

22 Claims, 3 Drawing Sheets

COMBUSTOR MODULE

BACKGROUND OF THE INVENTION

This invention relates generally to gas turbine engines, and, more particularly, to gas turbine engine combustors. One form of the present invention is directed to a combustor dome module.

Gas turbine engines with high specific thrust (that is, high thrust of the engine per engine area) require combustion liners capable of burning more fuel per volume compared to conventional combustors. Combustion in a gas turbine is generally accomplished via three stages: 1) fuel injection, 2) fuel mixture with air (oxidant), and finally 3) fuel/air mixture multi-step chemical reaction to obtain the gas temperature rise necessary to drive the engine and its payload. For a given design space in a combustion liner, only so much fuel can be burned efficiently without delivering unburned products. Mixing limitations arise due to the fact that all three of the above processes require a finite amount of time. If one is to enhance the limitations of a conventional combustor by adding more fuel to burn, some of these stages must be performed more efficiently within the allotted time and space. It is generally understood that the volume and size of the combustor is established by the cumulative residence time of all processes that take place in the combustion chamber.

Conventional annular combustion liners inject fuel at discrete circumferential locations inside the reaction zone, thereby creating circumferential fuel/air ratio non-uniformities that translate into temperature non-uniformities at the combustion liner exit. These combustor exit temperature non-uniformities eventually create turbine aerodynamic and material durability performance degradation.

The need, therefore, exists for a gas turbine combustor that allows the three stages of combustion to be performed more efficiently. The present invention meets this need in a novel and non-obvious way.

SUMMARY OF THE INVENTION

The present invention performs the fuel injection and mixing, two of the three necessary stages for combustion, outside of the reaction zone in a pre-mixing zone. One form of the present invention contemplates a combustor module that includes an annular pre-vaporizing chamber defined by an inner wall, and an outer wall, and a heat shield. The heat shield separates the pre-mixing zone from the reaction zone of the combustor. Fuel is injected into the pre-vaporizing chamber and sprayed onto the surface of the heat shield, thereby simultaneously vaporizing the fuel and cooling the heat shield. The heat shield also includes a pilot fueling spray opening to allow fuel to pass directly into the reaction zone to provide a piloting flame stability region therein.

In one embodiment of the combustor module of the present invention, the premixed fuel and air enter the reaction zone in an annularly uniform manner—a desirable result when such a module is coupled to an annular combustion liner configuration. This unique combustor module reduces the circumferential non-uniformities since the fuel and air are pre-mixed prior to entering the reaction zone. Further, the combustor module of the present invention permits optimization of the pre-mixing zone for the first two combustion stages so that the reaction zone can be optimized for the last combustion stage. Effective fuel/air premix is accomplished by delivering fuel using a multi-hole fueling spray nozzle capable of directing the fuel to the location needed for best fuel evaporation and best mixing within the pre-mixing zone. Fuel and air mixture inside this mixing region will be well in excess of the flammability limits of the fuel to prevent reaction from occurring prior to admitting the mixture into the reaction zone.

The dome features of the combustor according to one form of the present invention are designed to divert the fuel/air mixture exiting the pre-mixing zone in the following manner. First, some of the mixture is diverted towards the concave region formed by the heat shield to create a reacting trapped vortex at the center portion of the reaction zone. This reacting trapped vortex provides the anchoring flame necessary to maintain combustion stability within the reaction zone. This anchoring flame is located very close to the heat shield; consequently, the survivability of the heat shield depends on the backside cooling effectiveness of the fuel impingement/vaporization in the pre-mixing zone. Secondly, the remainder of the fuel/air mixture is diverted and further diluted with air entering the reaction zone through inner and outer swirlers. The combustion reaction, thus, occurs immediately downstream of the dome. The present invention promotes the combustion reaction nearest the dome to allow additional residence time to mix out any non-uniformities in the gas flow before the flow enters the turbine hardware.

The combustor module according to the present design, therefore, promotes rapid combustion inside the reaction zone of the combustor since residence time required for fuel injection and mixing has been already performed in the mixing region. Shortening the combustion residence time has a direct effect in shortening the combustor volume, or alternatively, it can increase the temperature rise of the combustor for a given combustor volume. A combustor equipped with such a combustor module is also capable of delivering a more uniform exit temperature pattern that benefits turbine performance and durability.

One object of the present invention is to provide a unique combustor module for a gas turbine engine.

Related objects and advantages of the present invention will be apparent from the following description.

DESCRIPTION OF THE PREFERRED EMBODIMENTS

Figure 1:
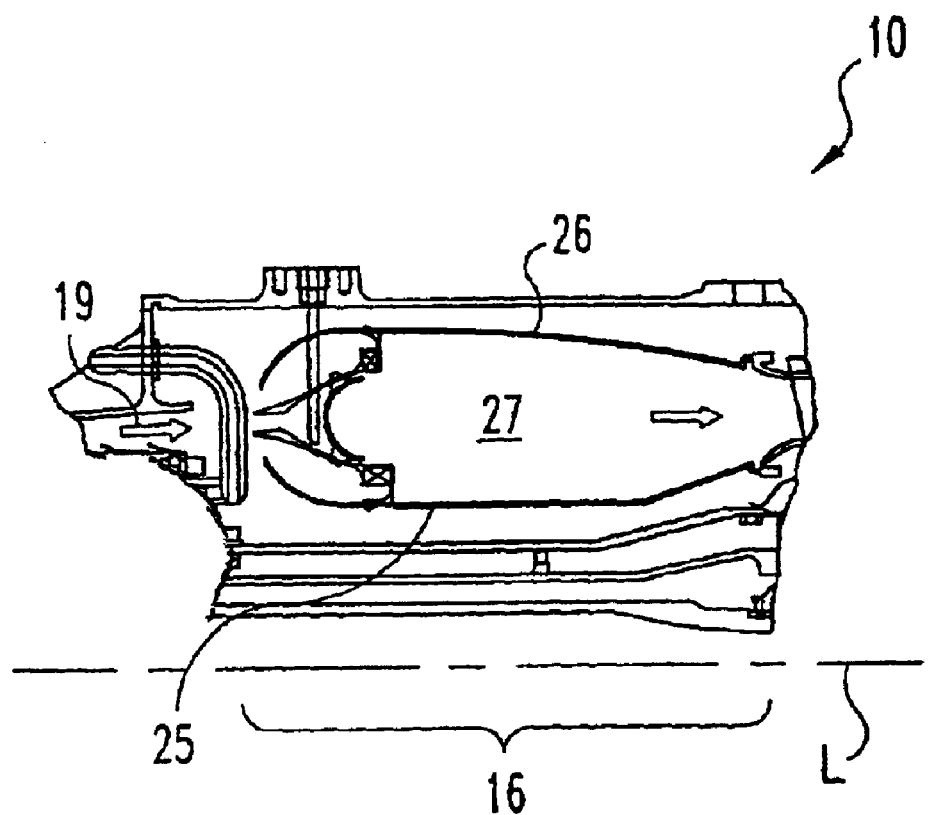
FIG. 1 is a side sectional schematic of a combustor dome module in accordance with one form of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a schematic sectional representation of a combustor section 16 comprising a portion of a gas turbine engine 10. It should be understood that the invention described herein is applicable to all types of gas turbine engines and is not intended to be limited to any specific type of gas turbine engine. In one form, gas turbine engine 10 includes a longitudinal axis L extending along the gaseous flow stream and has an annular configuration; however, other configurations are also contemplated as would occur to one of ordinary skill in the art. Gas turbine engine 10 includes a compressor section, a combustor section 16, and a turbine section integrated to produce an aircraft flight propulsion engine.

It should be understood that the term aircraft is generic, and is meant to include helicopters, airplanes, missiles, unmanned space devices and other substantially similar devices. It is also important to realize that there are a multitude of ways in which the gas turbine engine components can be linked together to produce a flight propulsion engine. For instance, additional compressor and turbine stages could be added with intercoolers connected between the compressor stages. Additionally, although gas turbine engine 10 has been described for use with an aircraft, it should be understood that engine 10 is equally suited to be used in industrial applications, such as pumping sets for gas and oil transmission lines, electricity generation, naval propulsion, and vehicular propulsion.

The compressor section includes at least one rotatable rotor having a plurality of compressor blades coupled thereto. The gaseous working fluid is passed through the compressor section where its pressure ratio is increased and directed into the combustor 16 for subsequent combustion. In a preferred embodiment of the present invention the working fluid is air. However, other working fluids are contemplated herein. The compressor discharge working fluid is illustrated by arrow 19 in FIG. 1. Further details regarding the general structure and operation of gas turbine engines are believed well known to those skilled in the art and are therefore deemed unnecessary for a full understanding of the principles of the present invention.

Figure 3:
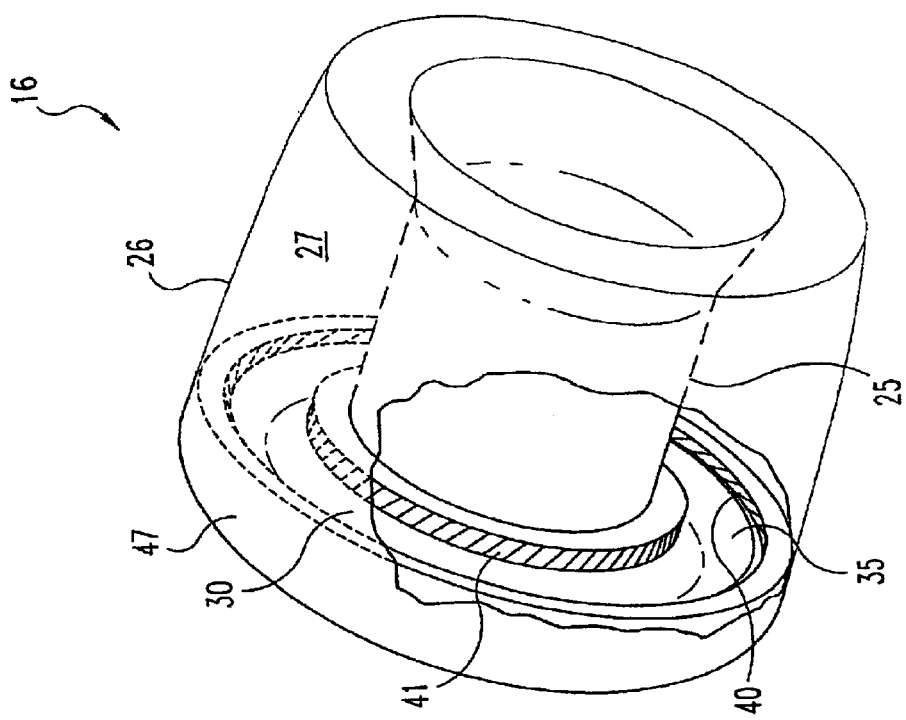
FIG. 3 is a partially fragmented, downstream perspective view of a combustor in accord with one embodiment of the present invention.
Figure 2:
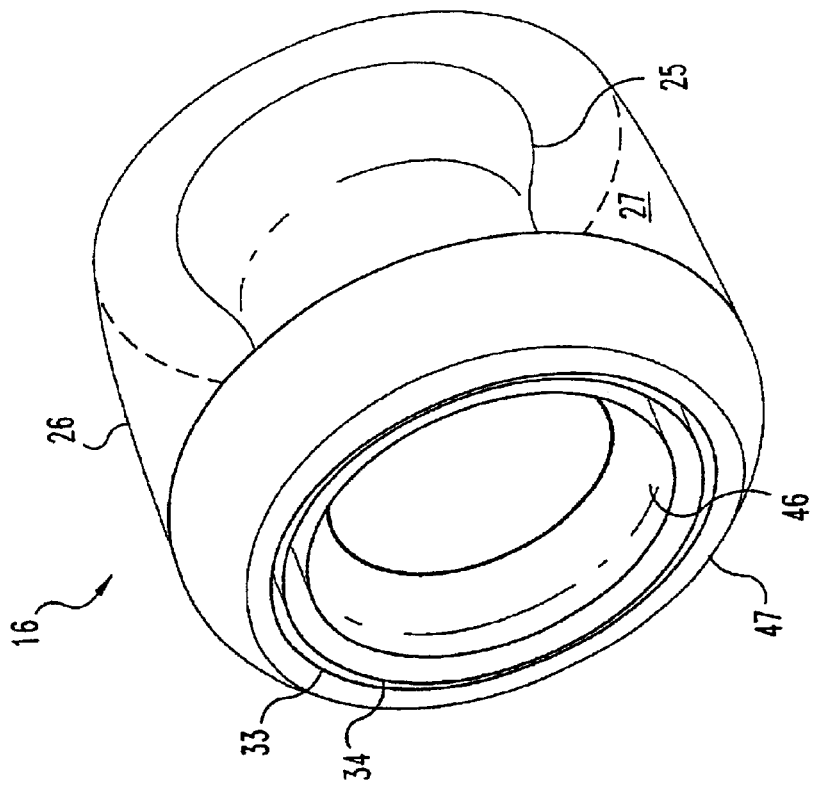
FIG. 2 is an upstream perspective view of a combustor in accord with one embodiment of the present invention.
Figure 4:
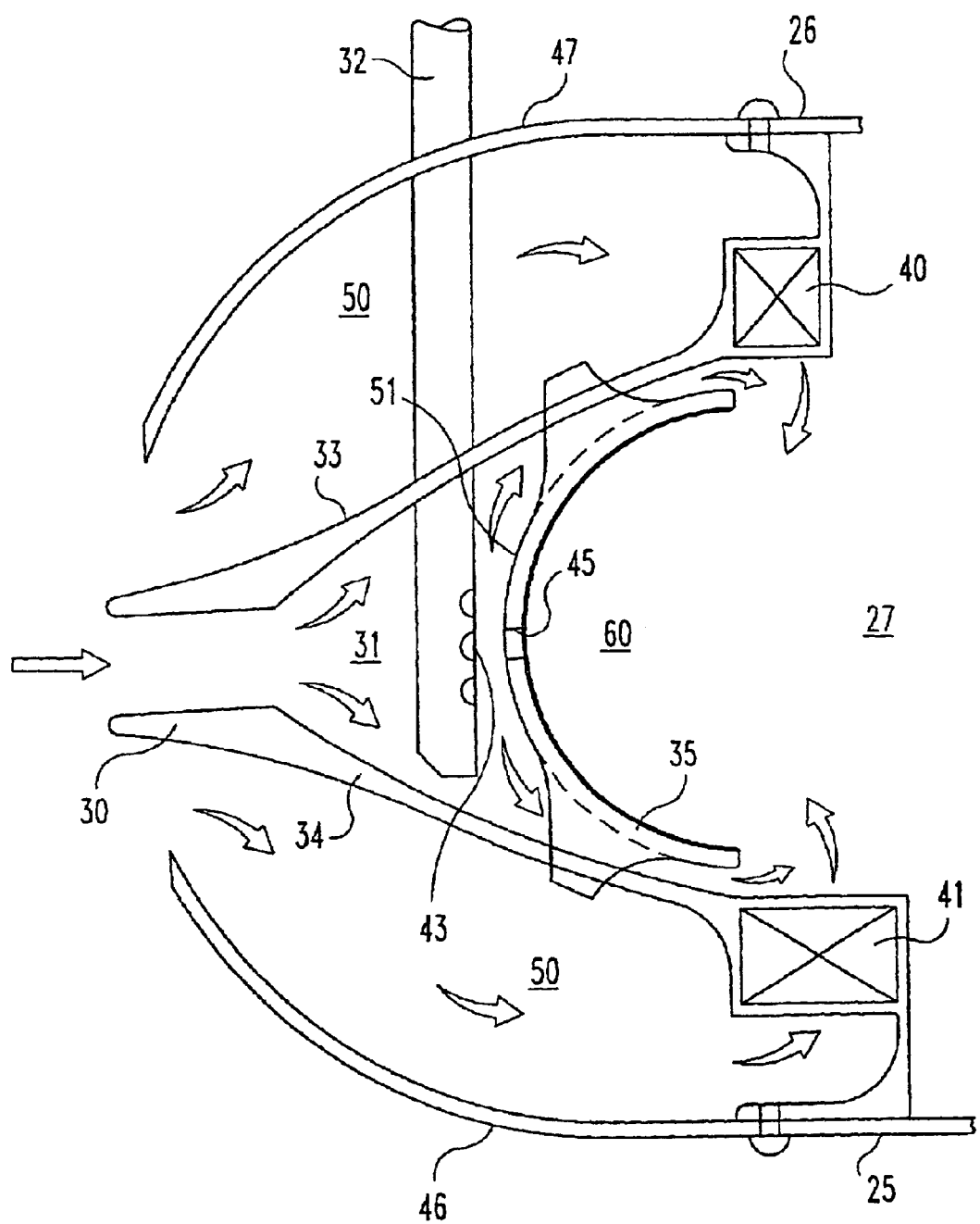
FIG. 4 is a side sectional schematic of a combustor dome module in accord with one embodiment of the present invention.

With reference to FIGS. 2–4, one embodiment of the combustor section 16 of the present invention will be described. Although, the present invention will be described in terms of an annular combustion chamber, it is understood that the present invention is also applicable to other configurations, such as can type or can-annular type combustors. Combustor section 16 includes an inner combustor wall 25 and an outer combustor wall 26 that define a reaction zone therebetween. In one preferred embodiment, combustor walls 25 and 26 are formed of a high temperature metallic 2-ply Lamilloy® material. Further, in form of the present invention, inner combustor wall 25 and outer combustor wall 26 are spaced radially apart to define an annular combustion chamber 27. The fuel and air mixture is burned within the combustion chamber 27, and this hot gaseous fluid stream is fed into the turbine section.

The inner combustor wall 25 and the outer combustor wall 26 are coupled to a combustor dome module 30 with the pre-mixing zone located therein. The combustor dome module 30 preferably includes a pre-vaporizing chamber 31 defined by an outer wall member 33 and an inner wall member 34 and a heat shield member 35. In a preferred embodiment, pre-vaporizing chamber 31 has an annular configuration. In one form of the present invention the inner wall member 34 and the outer wall member 33 are a single piece casting and include integral outer swirler 40 and integral inner swirler 41. In another embodiment of the present invention there is contemplated a multi-piece combustor dome module with the swirlers coupled thereto.

Pre-vaporizing chamber 31 has means disposed therein for the delivery of fuel into the chamber. In one form of the present invention the combustor section 16 includes a plurality of fueling nozzles 32 spaced around the pre-vaporizing chamber 31, and in one preferred embodiment the number of fueling nozzles is 8. Each fueling nozzle 32 has at least one opening 43 for the delivery of fuel. In one preferred form the fueling nozzle 32 has a plurality of openings 43, and in a more preferred embodiment the number of openings is defined as nine. The nine openings are preferably arranged in three rows with three openings each. Each row is oriented to spray fuel onto a different portion of heat shield 35. The middle row of openings is depicted in FIG. 4 and sprays fuel directly to the right (as viewed in FIG. 4) onto heat shield 35. The other two rows spray fuel onto heat shield 35 at locations circumferentially fore and aft of the section depicted in FIG. 4. In this way, one fueling nozzle is capable of spraying fuel over a large area of the heat shield.

Heat shield member 35 separates the pre-mixing zone from the reaction zone. It is subjected to the temperatures associated with a combustion environment and is preferably formed of a ceramic material or a thermal barrier coated metallic material. However, other materials are contemplated herein. In one form of the present invention the heat shield member is allowed to float or move relative to inner and outer wall members 33 and 34 so that the heat shield and the wall members can be made of materials having different thermal characteristics. A floating heat shield configuration allows ceramic materials to be used inside a metallic combustion chamber. Attachment of heat shield 35 is done preferably in the pre-mixing zone where the thermal gradients are low enough to permit conventional ceramic-to-metal interface attachments. In one preferred embodiment, heat shield member 35 has an annular configuration and includes pilot fueling spray opening 45 to allow fuel to pass into the piloting flame stability region 60 of the combustion zone 27. Further, an inner cowling 46 and an outer cowling 47 are coupled to the combustor dome module 30 and define a fluid flow passageway 50 for the passage of pressurized working fluid to the swirlers 40 and 41.

The compressed working fluid from the compressor passes into the combustor section 16 and flows into the fluid flow passageway 50 and the pre-vaporizing chamber 31. Fuel is discharged from the openings 43 and sprayed onto the outer surface 51 of the heat shield member 35. The fuel is vaporized upon hitting the heat shield member 35 and premixed with the incoming working fluid from the compressor in the pre-vaporizing chamber 31. Further, the spraying of the fuel onto the outer surface 51 functions to cool the heat shield member 35. The fuel and air mixture is at least partially premixed within the pre-vaporizing chamber 31 and flowed between the walls 33, 34 and the outer surface 51 of the heat shield member 35 and into the combustion chamber 27. The pilot fuel passes through the pilot fuel opening 45 into a piloting flame stability region 60 with the combustion chamber 27 to maintain flame stability.

In one embodiment, radial inflow bulk swirlers define the swirlers 40 and 41. However, the present invention contemplates the use of bulk swirlers that are either axial or radial. In one embodiment the swirlers are designed to impart swirl in the same direction for the fluid discharged from each of the swirlers. In another embodiment the swirlers impart swirl in opposite directions for the fluid discharged from the swirlers. In one form, the fluid flow exiting the bulk swirlers in the dome of the combustor recirculates forward towards the heat shield, thereby creating a double vortex. This double vortex allows the fuel and air to burn in a stable fashion near the heat shield and thus provide the flame stabilization mechanism for the rest of the flame reaction inside the combustion liner. The heat shield, in turn, prevents the flame reaction from flashing into the pre-mixing zone where the fuel injector tube is located. The fuel/air ratio inside the pre-mixing zone is sufficiently rich to prevent auto ignition inside this cavity, and the fluid exiting the pre-mixing zone is moving fast enough to prevent flame flash back. Bulk swirl inside the combustion chamber is used to maximize the volume of the primary zone and increase the residence time of the working fluid in the combustor to secure complete combustion within its confines.

With reference to FIG. 4, the vaporized fuel and air mixture is shown entering the combustion chamber between the heat shield member 35 and the swirlers 40 and 41. In an alternate embodiment, the fuel and air mixture is directed through the bulk swirlers into the combustion chamber. In yet another form of the present invention, a liquid fuel is sprayed into the combustion chamber through the swirl vanes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A combustor dome module for a gas turbine engine combustor comprising:
   an annular pre-vaporizing chamber defined by an outer wall, an inner wall, and a heat shield, said heat shield including an opening adapted to allow a fuel to pass into a piloting flame stability region of the gas turbine engine combustor;
   an outer swirler coupled to said outer wall of said pre-vaporizing chamber; and
   an inner swirler coupled to said inner wall of said pre-vaporizing chamber.

2. The combustor dome module of claim 1, wherein said inner swirler is formed integral with said inner wall member of said pre-vaporizing chamber, and said outer swirler is formed integral with said outer wall member of said pre-vaporizing chamber.

3. The combustor dome module of claim 1, wherein said heat shield is made of a ceramic material and is coupled to float relative to at least one of said inner and outer wall members of said pre-vaporizing chamber.

4. The combustor dome module of claim 1, wherein said inner swirler is adapted to impart a swirl to a flow discharged therefrom in a direction that is the same as, or opposite, that imparted to a flow discharged from said outer swirler.

5. The combustor dome module of claim 1, wherein each of said swirlers discharges a flow that recirculates toward said heat shield, thereby creating a double vortex.

6. A combustor for a gas turbine engine comprising:
   a combustion chamber having an annular configuration defined by an inner wall and an outer wall;
   a combustor dome module coupled to said inner and outer walls of said combustion chamber, said combustor dome module including an annular pre-vaporizing chamber defined by an inner wall member, an outer wall member, and a heat shield, said heat shield is made from ceramic material and coupled to float relative to said inner and outer wall members of said pre-vaporizing chamber;
   a working fluid flow passageway extending along said pre-vaporizing chamber for flowing a working fluid that has not passed through said pre-vaporizing chamber;
   a first swirler in fluid flow communication with said working fluid flow passageway to impart a swirl to the working fluid from said passageway and discharge into said combustion chamber; and
   means disposed in said pre-vaporizing chamber for delivering a fuel into said pre-vaporizing chamber.

7. The combustor of claim 6, wherein said heat shield includes an opening to allow fuel to pass into a piloting flame stability region of said combustion chamber.

8. The combustor of claim 6, further comprising a second swirler in fluid flow communication with said working fluid flow passageway to impart a swirl to the working fluid from said passageway and discharge into said combustion chamber.

9. The combustor of claim 8, wherein said first swirler is an inner swirler formed integral with said inner wall member of said pre-vaporizing chamber, and said second swirler is an outer swirler formed integral with said outer wall member of said pre-vaporizing chamber.

10. The combustor of claim 8, wherein said inner swirler is adapted to impart a swirl to a flow discharged therefrom in a direction that is the same as, or opposite, that imparted to a flow discharged from said outer swirler.

11. The combustor of claim 8, wherein each of said swirlers discharges a flow that recirculates forward toward said heat shield, thereby creating a double vortex.

12. The combustor of claim 8, wherein a vaporized fuel and air mixture exiting said pre-vaporizing chamber enters said combustion chamber between said heat shield and said swirlers.

13. The combustor of claim 6, wherein said means for delivering fuel into said pre-vaporizing chamber includes at least one fuel nozzle with at least one opening oriented to spray fuel onto said heat shield, whereby the fuel is normally vaporized upon reaching the heat shield.

14. The combustor of claim 13, wherein said at least one opening numbers nine.

15. The combustor of claim 6, wherein said means for delivering fuel into said pre-vaporizing chamber includes a plurality of fueling nozzles spaced around said annular pre-vaporizing chamber.

16. The combustor of claim 15, wherein said plurality of fueling nozzles numbers eight.

17. A gas turbine engine combustor comprising:
   a pre-mixing chamber;
   a reaction zone;
   a heat shield separating said pre-mixing chamber from said reaction zone, said heat shield having an outer surface in said pre-mixing chamber and has a substantially concave shape exposed to said reaction zone, said heat shield is coupled to a float relative to at least a portion of said pre-mixing chamber;
   an inner and outer cowling disposed around said pre-mixing chamber and defining a fluid flow passageway extending along said pre-mixing chamber for passage of a working fluid to said reaction zone without passing through said pre-mixing chamber;

at least one swirler in fluid flow communication with said fluid flow passageway to impart a swirl to the working fluid from said passageway; and a fueling nozzle disposed in said pre-mixing chamber for spraying fuel onto said outer surface of said heat shield, thereby cooling said heat shield.

18. A combustor dome module for a gas turbine engine combustor comprising:

an annular pre-vaporizing chamber defined by an outer wall, an inner wall, and a heat shield, said heat shield including an opening adapted to allow a fuel to pass into a piloting flame stability region of the gas turbine engine combustor, wherein said heat shield is coupled to float relative to at least one of said inner and outer wall members of said pre-vaporizing chamber;

an outer swirler coupled to said outer wall of said pre-vaporizing chamber; and an inner swirler coupled to said inner wall of said pre-vaporizing chamber.

19. The combustor of claim 18, which further comprises an inner and an outer cowling disposed around said pre-vaporizing chamber and defining a fluid flow passageway for passage of a pressurized working fluid to said swirlers.

20. The combustor of claim 19, wherein said fluid flow passageway delivers pressurized working fluid that has not passed through said pre-vaporizing chamber.

21. The combustor of claim 20, wherein said inner swirler is formed integral with said pre-vaporizing chamber, and said outer swirler is formed integral with said pre-vaporizing chamber.

22. A combustor for a gas turbine engine comprising:

a combustion chamber having an annular configuration defined by an inner wall and an outer wall;

a combustion chamber having an annular configuration defined by an inner wall and an outer wall;

a combustor dome module coupled to said inner and outer walls of said combustion chamber, said combustor dome module including an annular pre-vaporizing chamber defined by an inner wall member, an outer wall member, and a heat shield, said heat shield includes an opening to allow fuel to pass into a piloting flame stability region of said combustion chamber;

a working fluid flow passageway extending along said pre-vaporizing chamber for flowing a working fluid that has act passed through said pre-vaporizing chamber;

a first swirler in fluid flow communication with said working fluid flow passageway to impart a swirl to the working fluid from said passageway and discharge into said combustion chamber; and means disposed in said pre-vaporizing chamber for delivering a fuel into said pre-vaporizing chamber.

* * * * *

UNITED STATES PATENT AND TRADEMARK OFFICE
CERTIFICATE OF CORRECTION

PATENT NO. : 6,820,424 B2
DATED : November 23, 2004
INVENTOR(S) : Victor L. Oechsle et al.

It is certified that error appears in the above-identified patent and that said Letters Patent is hereby corrected as shown below:

Column 6,
Line 6, please delete "from ceramic" and insert -- of ceramic --.

Column 8,
Lines 8-9, please delete "a combustion chamber having an annular configuration defined by an inner wall and an outer wall;"

Signed and Sealed this

Twelfth Day of April, 2005

JON W. DUDAS
*Director of the United States Patent and Trademark Office*